United States Patent [19]

Weissenberger et al.

[11] Patent Number: 4,592,459
[45] Date of Patent: Jun. 3, 1986

[54] ELASTIC TORQUE TRANSMISSION UNIT

[75] Inventors: Helmuth Weissenberger, Theilheim; Karl-Heinz Werner, Schweinfurt, both of Fed. Rep. of Germany

[73] Assignee: Fichtel & Sachs AG, Schweinfurt, Fed. Rep. of Germany

[21] Appl. No.: 587,314

[22] Filed: Mar. 7, 1984

[30] Foreign Application Priority Data

Mar. 26, 1983 [DE] Fed. Rep. of Germany ... 8309042[U]

[51] Int. Cl.$^4$ .............................................. F16D 3/66
[52] U.S. Cl. .................................................. 192/106.2
[58] Field of Search ................ 192/106.2, 106.1, 3.29, 192/70.18, 70.17, 70.16

[56] References Cited

U.S. PATENT DOCUMENTS

| 2,097,627 | 11/1927 | Lewis | 192/106.2 |
| 2,115,819 | 5/1938 | Lewis | 192/106.2 |
| 2,284,278 | 5/1942 | Goodwin | 192/106.2 |
| 2,316,820 | 4/1943 | Thelander | 192/106.2 |
| 4,285,423 | 8/1981 | Fädler et al. | 192/106.2 |
| 4,347,717 | 9/1982 | LaMarche | 192/106.1 |
| 4,431,100 | 2/1984 | Kajikawa et al. | 192/106.2 |
| 4,451,244 | 5/1984 | LaMarche | 192/106.2 |

FOREIGN PATENT DOCUMENTS

| 2657306 | 10/1980 | Fed. Rep. of Germany . |
| 2183390 | 12/1973 | France . |
| 2218504 | 9/1974 | France . |
| 2365728 | 4/1978 | France . |
| 2526906 | 11/1983 | France . |

Primary Examiner—George H. Krizmanich
Attorney, Agent, or Firm—Toren, McGeady, Stanger, Goldberg & Kiel

[57] ABSTRACT

An elastic damper of a clutch disc comprises a middle disc and two side discs. Helical compression springs are accommodated in overlapping windows of the middle disc and the side discs. The angular deflection of the side discs with respect to the middle disc is limited by a radially outer projection of the middle disc engaging recesses in axially approached lugs of the side discs projecting beyond the radially circumferential edges of the side discs.

19 Claims, 2 Drawing Figures

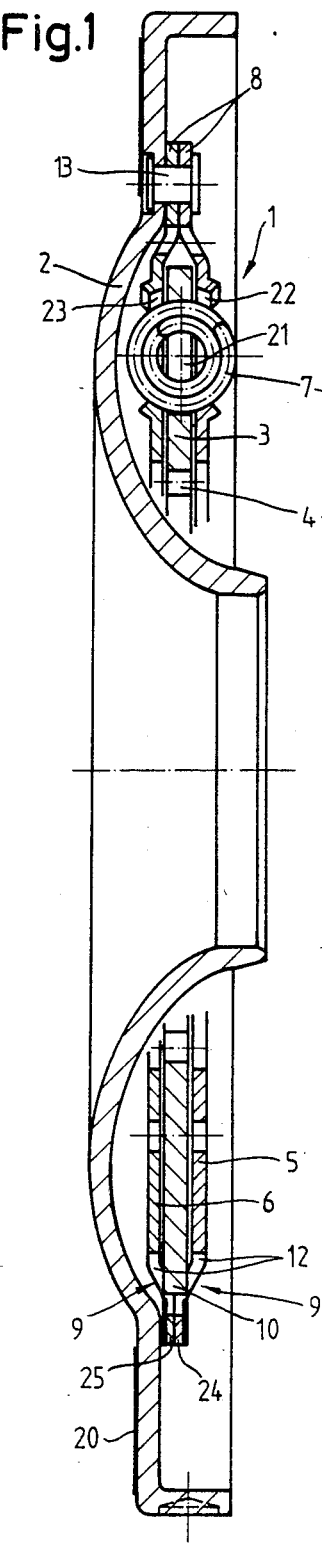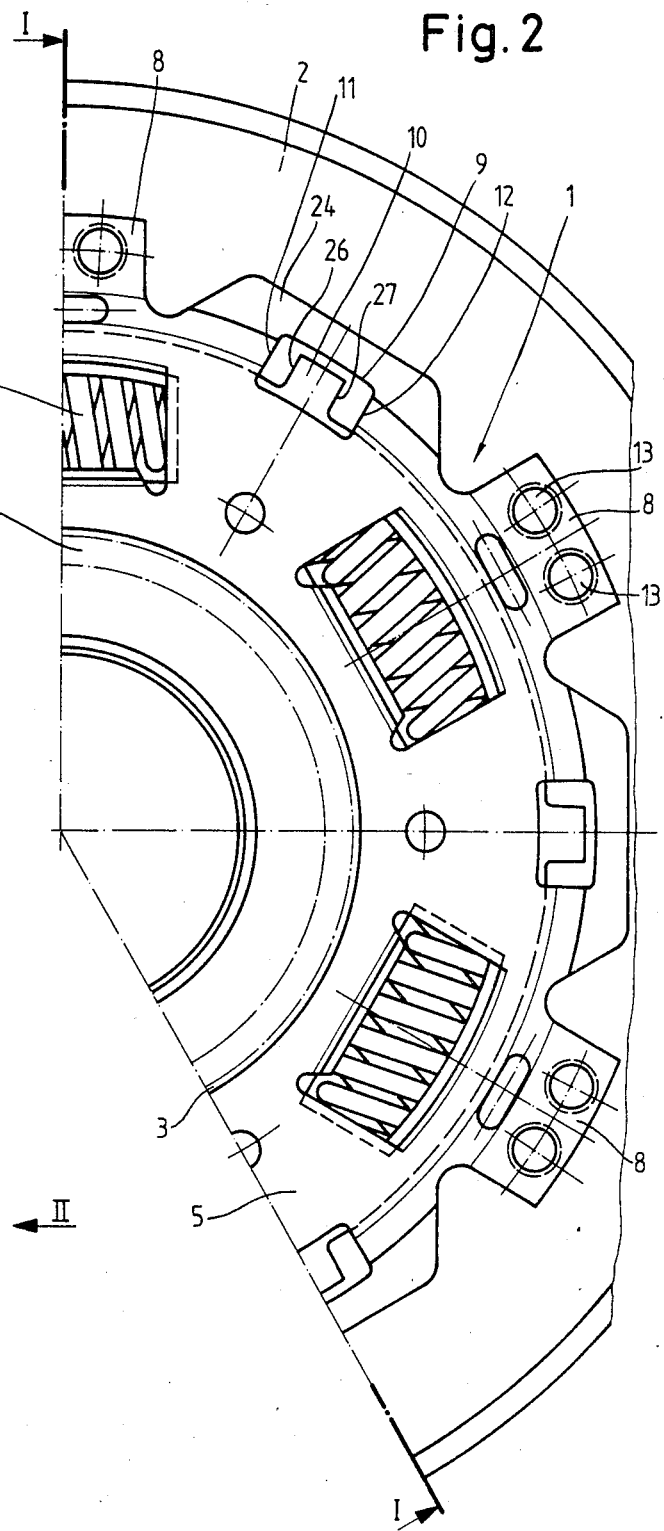

of the present invention to have an elastic torque transmission unit, in which the abutment means limiting deflection of the middle disc with respect to the side discs are located such as to avoid substantial limitations as to location, number and circumferential length of the helical compression springs.

ELASTIC TORQUE TRANSMISSION UNIT

BACKGROUND OF THE INVENTION

This invention relates to an elastic torque transmission unit, particularly for use in the torque transmission path between a combustion engine and a driving wheel of a motor vehicle. This elastic torque transmission unit is frequently provided in the clutch disc of a clutch connected in series between the output member of a combustion engine and the input member of a gear box. This is true for driving systems with purely mechanical clutches as well as for driving systems with hydrodynamic torque converters, in which the hydrodynamic torque converter can be bridged by a mechanical clutch.

The purpose of the elastic torque transmission unit is to damp oscillations in the torque transmission path, which oscillation may arise, e.g. in the combustion engine. The elastic torque transmission unit may be combined with frictional damping means, as is well known in the art.

STATEMENT OF THE PRIOR ART

In German Pat. No. 2,657,306 there is disclosed an elastic torque transmission unit comprising a middle disc located between two side discs. The middle disc is in torque transmitting connection with a first torque transmitting member and the side discs are in torque transmitting connection with a second torque transmitting member of the clutch disc. The clutch disc is used for bridging a hydraulic torque converter arranged between the torque output member of a combustion engine and the torque input member of a gear box in a motor vehicle. Bridging of the hydraulic torque converter is desired under certain operational conditions and such bridging is effected by frictional engagement of the clutch disc with a clutch disc engagement member. The clutch disc engagement member is connected for common rotation with the torque output member of the combustion engine and the clutch disc is connected for common rotation with the input member of the gear box. In view of selective engagement or disengagement of the clutch disc with the clutch engagement member, the clutch disc fulfills also the function of a piston in a fluidic clutch operating system.

The torque transmission unit further comprises overlapping windows in the middle disc and in the side discs. Tangential compression springs are accommodated within said windows such as to transmit a torque between the side discs and the middle disc.

It is desirable to limit the elastic deflection of the side discs with respect to the middle disc.

In U.S. Pat. No. 4,285,423 a clutch disc is shown, in which the torque transmission unit is also established by a middle disc, two side discs and tangential compression springs received by overlapping windows of the middle disc and the side discs. The angular deflection of the side discs with respect to the middle disc is limited by a bolt member extending in axial direction between the side discs and passing through a recess of the middle disc. The bolt and the recess are located circumferentially between subsequent compression springs in a radial distance from the clutch disc axis which substantially corresponds to the radial distance of the axes of the compression springs from the axis of the clutch disc.

This known construction has shown excellent properties in operational practice. However, the location of bolts and recesses gives a certain limitation on the location, number and length of the tangential compression springs.

OBJECT OF THE INVENTION

It is the object of the present invention to have an elastic torque transmission unit, in which the abutment means limiting deflection of the middle disc with respect to the side discs are located such as to avoid substantial limitations as to location, number and circumferential length of the helical compression springs.

A further object of the invention is to provide an elastic torque transmission unit of simplified design and reduced manufacturing costs.

SUMMARY OF THE INVENTION

In view of at least one of the above mentioned objects an elastic torque transmission unit, particularly for use in the torque transmission path between a combustion engine and a driving wheel of a motor vehicle comprises (a) a middle disc having an axis, a middle plane perpendicular to said axis, a radially outer cirumferential edge, two side faces substantially perpendicular with respect to said axis and first connecting means for torque transmitting connection to a first torque transmitting member;

(b) two cover discs adjacent both side faces of said middle disc, respectively, having an axis substantially coinciding with said axis of said middle disc and being interconnected for common rotation with respect to said middle disc about said axes;

(c) a plurality of compression springs accommodated in axially aligned windows of said middle disc and said side discs, said compression springs having axes substantially tangential with respect to said axis of said middle disc and having end portions engaging circumferentially spaced edges of said windows;

(d) second connecting means connecting said side discs to a second torque transmitting member, said second connecting means being located in circumferentially spaced locations of said side discs radially outwardly of said circumferentially outer edge of said middle disc.

The improvement for overcoming the disadvantages of the known construction comprises the following features:

(e) each of said side discs includes at least one circumferential zone circumferentially extending between subsequent locations of said second connecting means and radially extending beyond said radially outer circumferential edge of said middle disc;

(f) said side discs being approached towards each other within the respective zone;

(g) said side discs being, when regarded in a section plane containing said axis of said side discs and extending through said zones, symmetrical with respect to said middle plane of said middle disc;

(h) said side discs being provided in the respective zones with axially aligned recesses;

(i) said middle disc having at least one radial projection beyond said radially outer circumferential edge and in axial alignment with said recesses, said radial projection having a circumferential width smaller than the circumferential width of said recesses;

(k) said radial projection having circumferentially spaced terminal edges in circumferential alignment with respective circumferentially spaced terminal edges of said recesses such as to limit angular deflection of said middle disc with respect to said side discs.

As the radial projections and the recesses are located radially outwardly of the tangential compression springs, there is no further limitation as to the number and circumferential length of the tangential compression springs.

The abutment means are established by parts integral with the middle disc and the side discs, whereby manufacturing costs are reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail below by reference to an example of embodiment. In detail:

FIG. 1 shows a longitudinal section through an elastic torque transmission unit in accordance with the invention according to section line I—I of FIG. 2;

FIG. 2 shows an end view of the elastic torque transmission unit of FIG. 1 in the direction of arrow II of FIG. 1.

DESCRIPTION OF THE PREFERRED EMBODIMENT

The torque transmission unit 1 as illustrated is provided in the torque transmission path between an output member of a combustion engine and an input member of a gear box. More particularly the torque transmission unit is connected by rivets 13 to a clutch disc 2 and is connectable by splines 4 to an input shaft of a gear box. The clutch disc 2 is engageable by a friction face 20 with an engagement member rotating with the pumping wheel of a hydrodynamic torque converter (not shown). The turbine wheel of the hydrodynamic torque converter is connected for common rotation with and axial movement with respect to the input shaft of the gear box. Moreover, the clutch disc 2 is used as a piston of a hydraulic clutch engagement and disengagement system. When the clutch disc 2 by its engagement face 20 engages the engagement member connected for common rotation with the pump wheel, the hydrodynamic torque converter is bridged. When the clutch disc 2 is out of frictional engagement with the engagement member connected for common rotation with the pump wheel, the hydrodynamic torque converter is not bridged and the torque is transmitted only through the hydrodynamic torque converter. Such a system is known per se e.g. from German Pat. No. 2,657,306.

The elastic torque transmission unit 1 comprises a middle disc 3 with radially inner splines 4, said splines being shaped such as to engage corresponding splines of a gear box input shaft. Further the torque transmission unit comprises two cover or side discs 5, 6 on both sides of the middle disc 3. The side discs 5, 6 have radially outwardly directed tabs 8 which are connected by the rivets 13 to the clutch disc 2. The tabs 8 are axially approached to each other by cranking, as can be seen from FIG. 1. The cranking is symmetrical with respect to a middle plane of the middle disc 3.

The middle disc 3 and the side discs 5, 6 are provided with windows 21, 22 and 23, respectively. These windows are in axial alignment when no load is transmitted through the torque transmission unit. Helical compression springs 7 are housed within the windows 21, 22 and 23 such as to transmit torque between the middle disc 3 and the side discs 5, 6.

Between subsequent pairs of tabs 8 the side discs 5, 6 are provided with radially projecting lugs 24, 25 which are approached to each other by cranking as can be seen from the lower part of FIG. 1. The cranking starts at a location radially outwardly from the circle about the axis which contains the radially outer edges of the windows 22, 23.

The lugs 24, 25 are provided with recesses 9 having terminal edges 11 and 12.

The middle disc 3 is provided with radial projections 10. One such radial projection can be seen from FIG. 2. The radial projection 10 overlaps with the recesses 9. The radial projection 10 has terminal edges 26, 27. The circumferential width of the radial projection 10 is smaller than the circumferential width of the recesses 9.

In the unloaded condition the radial projection 10 is maintained by the compression spring 7 in the middle position with respect to the recesses 9 as shown in FIG. 2. On occurrence of a torque or of torsional vibrations the projection 10 is deflected with respect to the recesses 9 to a limited extent, because the terminal edges 26 and 27 are aligned in circumferential direction with the terminal edges 11 and 12 of the recesses 9 such that the terminal edges 26, 27 abut the terminal edges 11, 12 after a predetermined deflection.

The two side discs are identical in shape so that only one type of side disc is necessary.

It is to be noted that the middle disc 3 has substantially constant thickness along its radial extension.

The rivets interconnecting the tabs 8 and connecting the tabs 8 to the clutch disc 2 can be replaced by welding points.

While a specific embodiment of the invention has been shown and described in detail to illustrate the application of the inventive principles, it will be understood that the invention may be embodied otherwise without departing from such principles.

What is claimed is:

1. In an elastic torque transmission unit, particularly for use in the torque transmission path between a combustion engine and a driving wheel of a motor vehicle, said elastic torque transmission unit comprising
   (a) a middle disc (3) having an axis, a middle plane perpendicular to said axis, a radially outer circumferential edge, two side faces substantially perpendicular with respect to said axis and first connecting means (4) for torque transmitting connection to a first torque transmitting member;
   (b) two cover discs (5, 6) each adjacent a different side face of said middle disc (3), respectively, having an axis substantially coinciding with said axis of said middle disc (3) and being interconnected for common rotation with respect to said middle disc (3) about said axes;
   (c) a plurality of compression springs (7) accommodated in axially aligned windows (21, 22, 23) of said middle disc (3) and said cover discs (5, 6), said helical compression springs (7) having axes substantially tangential with respect to said axis of said middle disc (3) and having end portions engaging circumferentially spaced edges of said windows (21, 22, 23);

(d) second connecting means (8, 13) connecting said cover discs (5, 6) to a second torque transmitting member (2), said second connecting means (8, 13) being located in circumferentially spaced locations of said cover discs (5, 6) radially outwardly of said circumferentially outer edge of said middle disc (4);

(e) each of said cover discs (5, 6) including at least one circumferential zone (24, 25) circumferentially extending between adjacent locations of said second connecting means (13) and radially extending beyond said radially outer circumferential edge of said middle disc (3);

(f) said cover discs (5, 6) being approached towards each other within the respective zone (24, 25);

(g) said cover discs (5, 6) being, when regarded in a section plane containing said axis of said cover discs (5, 6) and extending through said zone (24, 25), symmetrical with respect to said middle plane of said middle disc (3);

(h) said cover discs (5, 6) being provided in the respective zones (24, 25) with axially aligned recesses (9);

(i) said middle disc (3) having at least one radial projection (10) beyond said radially outer circumferential edge and in axial alignment with said recesses (9), said radial projection (10) having a circumferential width smaller than the circumferential width of said recesses (9);

(k) said radial projection (10) having circumferentially spaced terminal edges (26, 17) in circumferential alignment with respective circumferentially spaced terminal edges (11, 12) of said recesses (9) such as to limit angular deflection of said middle disc (3) with respect to said cover discs (5, 6).

2. An elastic torque transmission unit as claimed in claim 1, said cover discs (5, 6) being approached to each other in the respective zones (24, 25) in a crank-shaped way.

3. An elastic torque transmission unit as claimed in claim 1, said circumferential zones (24, 25) being defined by radially projection lugs (24, 25) of the cover discs (5, 6).

4. An elastic torque transmission unit as claimed in claim 1, said second connecting means (8, 13) comprising radially projecting tabs (8) of said cover discs (5, 6), said tabs (8) being approached to each other and being symmetrical with respect to said middle plane of said middle disc (3).

5. An elastic torque transmission unit as claimed in claim 1, said tabs (8) being approached to each other in a crank-shaped way.

6. An elastic torque transmission unit as claimed in claim 1, said tabs (8) being riveted to said second torque transmission member (2).

7. An elastic torque transmission unit as claimed in claim 1, said first connecting means (4) being defined by spline means (4) at a radially inner circumferential edge of said middle disc (3).

8. An elastic torque transmission unit as claimed in claim 1, said second transmission member (2) being a clutch disc member (2) of a hydraulic torque converter unit, said hydraulic torque converter unit comprising a stator, a pump wheel and a turbine wheel, said pump wheel being connected for common rotation with a combustion engine output member, said turbine wheel being connected for common rotation with a gear box input member, said clutch member (2) being connected for common rotation with said gear box input member and being engageable with an engagement member fixed for common rotation with said pump wheel.

9. An elastic torque transmission unit as claimed in claim 8, said clutch disc member (2) defining a piston member of a fluidic clutch engagement and disengagement system.

10. An elastic torque transmission unit as claimed in claim 8, said clutch disc member (2) having an annular depression about its axis, said annular depression receiving at least part of the elastic torque transmission unit.

11. An elastic torque transmission unit as claimed in claim 1, said cover discs being of identic shape.

12. In an elastic torque transmission unit, particularly for use in the torque transmission path between a combustion engine and a driving wheel of a motor vehicle, said elastic torque transmission unit comprising (a) a middle disc (3) having an axis, a middle plane perpendicular to said axis, a radially outer circumferential edge, two side faces substantially perpendicular with respect to said axis and first connecting means (4) for torque transmitting connection to a first torque transmitting member;

(b) two cover discs (5, 6) adjacent both side faces of said middle disc (3), respectively, having an axis substantially coinciding with said axis of said middle disc (3) and being interconnected for common rotation with respect to said middle disc (3) about said axes;

(c) a plurality of compression springs (7) accommodated in axially aligned windows (21, 22, 23) of said middle disc (3) and said cover discs (5, 6), said helical compression springs (7) having axes substantially tangential with respect to said axis of said middle disc (3) and having end portions engaging circumferentially spaced edges of said windows (21, 22, 23);

(d) second connecting means (8, 13) connecting said cover discs (5, 6) to a second torque transmitting member (2), said second connecting means (8, 13) being located in circumferentially spaced locations of said cover discs (5, 6) radially outwardly of said circumferentially outer edge of said middle disc (3);

(e) each of said cover discs (5, 6) including at least one circumferential zone (24, 25) circumferentially extending between subsequent locations of said second connecting means (13) and radially extending beyond said radially outer circumferential edge of said middle disc (3);

(f) said cover discs (5, 6) being approached towards each other within the respective zone (24, 25);

(g) said cover discs (5, 6) being, when regarded in a section plane containing said axis of said cover discs (5, 6) and extending through said zone (24, 25), symmetrical with respect to said middle plane of said middle disc (3);

(h) said cover discs (5, 6) being provided in the respective zones (24, 25) with axially aligned recesses (9);

(i) said middle disc (3) having at least one radial projection (10) beyond said radially outer circumferential edge and in axial alignment with said recesses (9), said radial projection (10) having a circumferential width smaller than the circumferential width of said recesses (9);

(k) said radial projection (10) having circumferentially spaced terminal edges (26, 27) in circumferential alignment with respective circumferentially spaced terminal edges (11, 12) of said recesses (9) such as to limit angular deflection of said middle disc (3) with respect to said cover discs (5, 6);

(l) said cover discs (5, 6) being approached to each other in the respective zones (24, 25) in a crank-shaped way;

(m) said circumferential zones (24, 25) being defined by radially projecting lugs (24, 25) of the cover discs (5, 6);

(n) said radial projection (10) being substantially accommodated within said recesses (9) and inside the contour of said cover discs (5, 6) and said circumferential zones (24, 25) when regarded in a section plane containing said axis of said cover discs (5, 6) and extending through said radial projection (10).

13. In an elastic torque transmission unit, particularly for use in the torque transmission path between a combustion engine and a driving wheel of a motor vehicle, said elastic torque transmission unit comprising (a) a middle disc (3) having an axis, a middle plane perpendicular to said axis, a radially outer circumferential edge, two side faces substantially perpendicular with respect to said axis and first connecting means (4) for torque transmitting connection to a first torque transmitting member;

(b) two cover discs (5, 6) adjacent both side faces of said middle disc (3), respectively, having an axis substantially coinciding with said axis of said middle disc (3) and being interconnected for common rotation with respect to said middle disc (3) about said axes;

(c) a plurality of compression springs (7) accommodated in axially aligned windows (21, 22, 23) of said middle disc (3) and said cover discs (5, 6), said helical compression springs (7) having axes substantially tangential with respect to said axis of said middle disc (3) and having end portions engaging circumferentially spaced edges of said windows (21, 22, 23);

(d) second connecting means (8, 13) connecting said cover discs (5, 6) to a second torque transmitting member (2), said second connecting means (8, 13) being located in circumferentially spaced locations of said cover discs (5, 6) radially outwardly of said circumferentially outer edge of said middle disc (3);

(e) each of said cover discs (5, 6) including at least one circumferential zone (24, 25) circumferentially extending between subsequent locations of said second connecting means (13) and radially extending beyond said radially outer circumferential edge of said middle disc (3);

(f) said cover discs (5, 6) being approached towards each other within the respective zone (24, 25);

(g) said cover discs (5, 6) being, when regarded in a section plane containing said axis of said cover discs (5, 6) and extending through said zone (24, 25), symmetrical with respect to said middle plane of said middle disc (3);

(h) said cover discs (5, 6) being provided in the respective zones (24, 25) with axially aligned recesses (9);

(i) said middle disc (3) having at least one radial projection (10) beyond said radially outer circumferential edge and in axial alignment with said recesses (9), said radial projection (10) having a circumferential width smaller than the circumferential width of said recesses (9);

(k) said radial projection (10) having circumferentially spaced terminal edges (26, 27) in circumferential alignment with respective circumferentially spaced terminal edges (11, 12) of said recesses (9) such as to limit angular deflection of said middle disc (3) with respect to said cover discs (5, 6);

(l) said cover discs (5, 6) being approached to each other in the respective zones (24, 25) in a crank-shaped way;

(m) said circumferential zones (24, 25) being defined by radially projection lugs (24, 25) of the cover discs (5, 6);

(n) said second connecting means (8, 13) comprising radially projecting tabs (8) of said cover discs (5, 6), said tabs (8) being approached to each other and being symmetrical with respect to said middle plane of said middle disc (3);

(o) said tabs (8) being approached to each other in a crank-shaped way;

(p) said tabs (8) being riveted to said second torque transmission member (2) by rivets (13) extending through both a pair of respective tabs (8) and the second torque transmission member (2);

(q) said second torque transmission member (2) being located adjacent one side of a tab of a pair of said tabs (8) which is remote from the other tab of said pair of tabs (8);

(r) said second torque transmission member (2) being a clutch disc member of a hydraulic torque converter unit and having an annular depression about its axis, said annular depression receiving at least part of the elastic torque transmission unit.

14. An elastic torque transmission unit as set forth in claim 1, wherein said axially aligned windows (21, 22, 23) are spaced radially inwardly from the radially outer circumferential edge of said middle disc.

15. An elastic torque transmission unit as claimed in claim 14, wherein one said radial projection (10) is located between and spaced circumferentially from an adjacent pair of said axially aligned windows (21, 22, 23).

16. An elastic torque transmission unit as set forth in claim 12, wherein said axially aligned windows (21, 22, 23) are spaced radially inwardly from the radially outer circumferential edge of said middle disc.

17. An elastic torque transmission unit as claimed in claim 16, wherein one said radial projection (10) is located between and spaced circumferentially from an adjacent pair of said axially aligned windows (21, 22, 23).

18. An elastic torque transmission unit as set forth in claim 13, wherein said axially aligned windows (21, 22, 23) are spaced radially inwardly from the radially outer circumferential edge of said middle disc.

19. An elastic torque transmission unit as set forth in claim 18, wherein one said radial projection (10) is located between and spaced circumferentially from an adjacent pair of said axially aligned windows (21, 22, 23).

* * * * *